United States Patent [19]

Willner, Jr.

[11] Patent Number: 4,534,508
[45] Date of Patent: Aug. 13, 1985

[54] ANTI-SKID DEVICE FOR VEHICLES

[76] Inventor: Lucas Willner, Jr., 14992 Kilbourne, Detroit, Mich. 48213

[21] Appl. No.: 520,607

[22] Filed: Aug. 5, 1983

[51] Int. Cl.³ ............................................. E01B 23/00
[52] U.S. Cl. ............................... 238/14; 224/42.03 R; 242/107.7
[58] Field of Search ............ 238/14; 152/208, 213 R, 152/214; 242/107.7; 224/42.03 R-42.08

[56] References Cited

U.S. PATENT DOCUMENTS

| | | | |
|---|---|---|---|
| 1,257,647 | 2/1918 | Spahn | 152/214 X |
| 2,543,176 | 2/1951 | Komassa | 242/107.7 |
| 2,611,834 | 9/1952 | Simons | 242/107.7 X |
| 3,640,459 | 2/1972 | Preisler | 238/14 |
| 3,965,956 | 6/1976 | Whatley, Jr. | 152/214 |
| 4,046,297 | 9/1977 | Bland | 224/42.03 B |

Primary Examiner—Randolph A. Reese
Attorney, Agent, or Firm—Robert G. Mentag

[57] ABSTRACT

An anti-skid device for use with a vehicle ground-engaging wheel, and which includes a traction pad for wedging under a vehicle wheel to allow traction thereon upon rotation of a vehicle wheel. A retractor apparatus is adapted to be mounted on the bumper of the vehicle, and it includes a housing in which is rotatably mounted a cable and return spring reel. A cable is coiled around the reel, and it extends through an opening in the housing and is adapted to be attached to a handle on the pad. After the vehicle has moved over the pad and forward a distance equal to the length of the cable, a jerk is imposed on the cable by the forwardly moving vehicle which releases a spring loaded retainer pin that holds the reel in a wound-up position during movement of the wheel over the pad, and permits the reel to move in a reverse direction to retract the cable and move the pad to a position adjacent the retractor apparatus.

9 Claims, 19 Drawing Figures

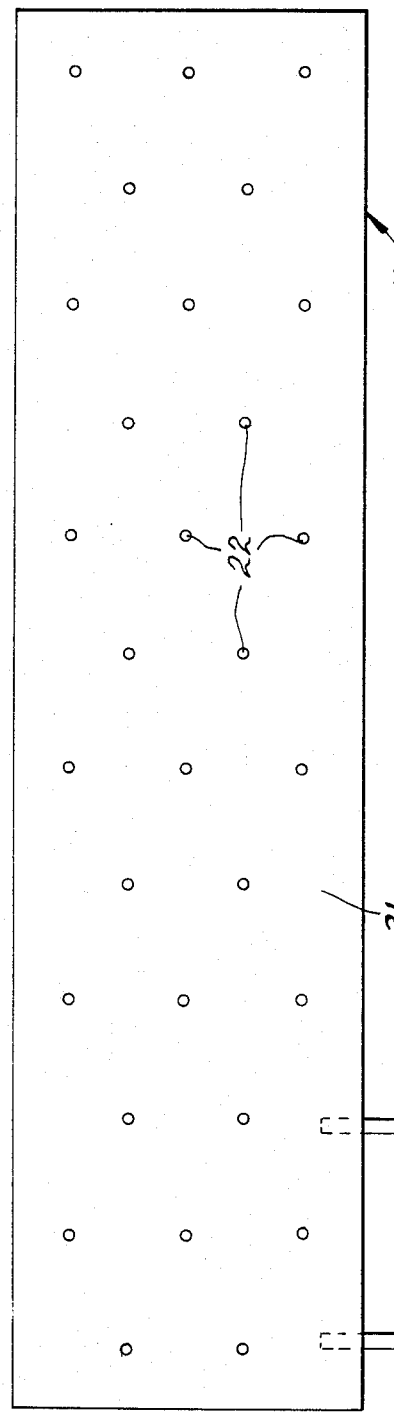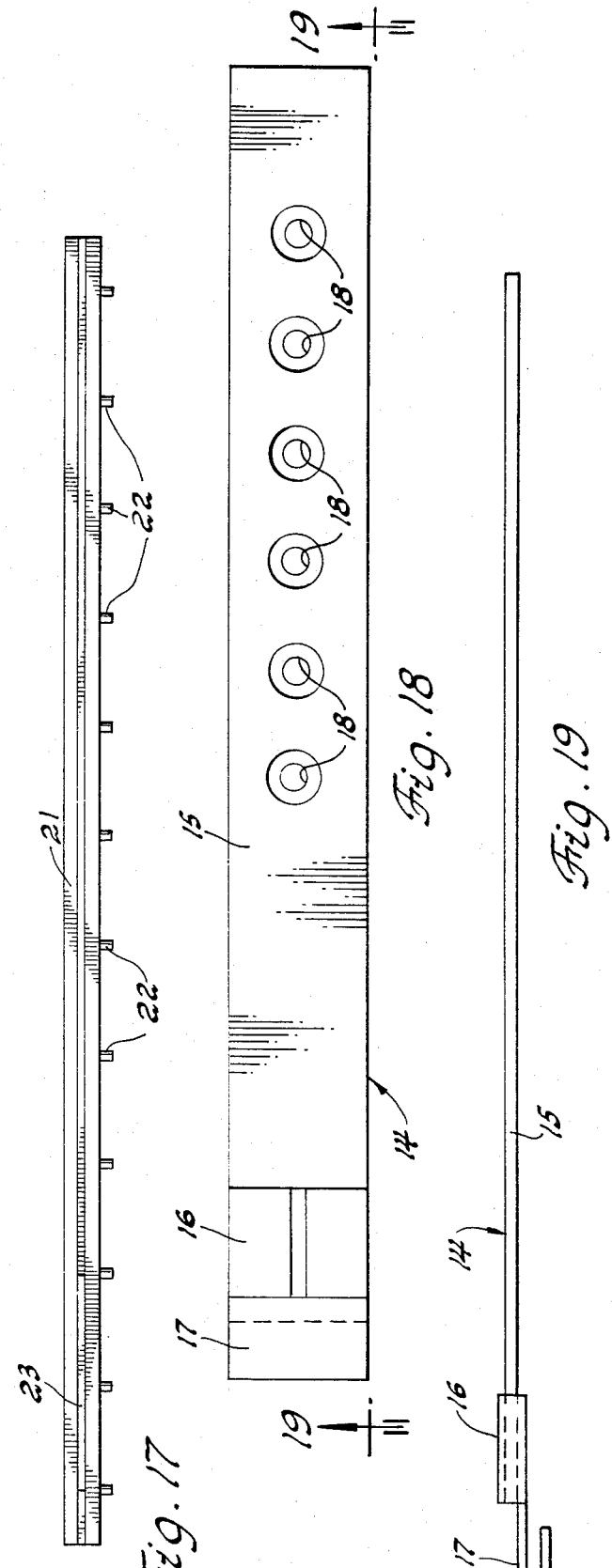

ANTI-SKID DEVICE FOR VEHICLES

TECHNICAL FIELD

This invention relates generally to the automobile art, and more particularly to an anti-skid device for automobiles and like vehicles. The anti-skid device of the present invention is adapted to prevent slipping of a traction or non-traction wheel of a vehicle, such as on ice, in snow, in mud or the like, by means of an anti-skid pad and a pad retractor means.

BACKGROUND ART

It is known in the vehicle art to provide traction pads to function as anti-skid devices for a traction wheel on an automobile, or other vehicle. It is also known to provide a bumper attachment apparatus for such anti-skid pad, and to couple the pad to a vehicle, such as to the rear bumper of a vehicle. U.S. Pat. No. 2,428,680 discloses a pad having a traction surface and a bumper attachment apparatus having a spring which is coupled to the pad via a chain. U.S. Pat. No. 4,223,835 discloses a traction pad for use with a vehicle. U.S. Pat. Nos. 3,640,459, 3,997,110 and 4,265,399 disclose anti-skid devices which include traction pads and attachment means to couple the pads to a bumper. U.S. Pat. No. 3,965,956 discloses a chain device having a spring loaded, bumper attached retractor.

DISCLOSURE OF THE INVENTION

In accordance with the present invention, an anti-skid pad is provided for use under a traction or non-traction wheel of an automobile, or like vehicle, and a retractor means is provided for retracting the anti-skid pad after the automobile has passed over the same, to permit the automobile to continue on, to a ground surface where it can get traction without getting stuck or immobilized again. The anti-skid pad comprises an elongated pad made of a suitable material, and provided with studs for engaging the ground. The back end of the anti-skid pad is placed against the front end of the wheel of a vehicle upon which it is desired to drive the wheel. A retractor means is adapted to be releasably mounted on the bumper of the vehicle, adjacent the wheel under which the pad is to be used, and the tractor means is connected to the pad by an elongated cable, or the like. When the anti-skid pad and retractor means and interconnecting cable have been put in position, the driver of the vehicle then slowly drives up onto the pad, and when the wheel has moved onto the pad, the speed of the vehicle is increased so that the vehicle moves from the stuck position and is then continuously moved to a position where the vehicle will not get stuck again. In the meantime, after the wheel which was stuck passes over the anti-skid pad, the vehicle will continue forwardly until the interconnecting cable is in a position whereby full movement of the vehicle will jerk the pad forward in the direction of the movement of the vehicle, and the retractor means will operate to retract the cable, and pull the anti-skid pad to a position adjacent the bumper, and releasably hold it in place.

BRIEF DESCRIPTION OF THE DRAWINGS

FIG. 16 is a top plan view of an anti-skid pad employed in the invention.

FIG. 17 is a side elevation view of the anti-skid pad illustrated in FIG. 16, taken along the line 17—17 thereof, and looking in the direction of the arrows.

FIG. 18 is a top plan view of a retractor means attachment strap employed in the direction.

FIG. 19 is a side elevation view of the attachment strap structure illustrated in FIG. 18, taken along the line 19—19 thereof, and looking in the direction of the arrows.

BEST MODE OF CARRYING OUT THE INVENTION

Figure 1:
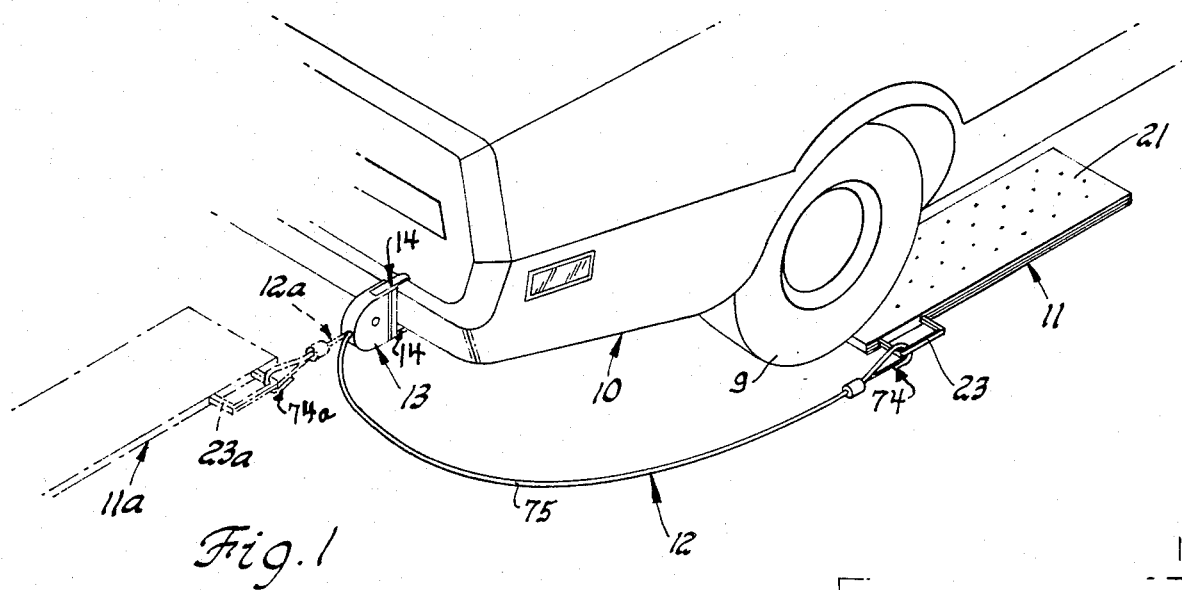
FIG. 1 is a fragmentary, perspective view of the right rear end of a passenger vehicle, as an automobile, and showing a traction wheel, with an anti-skid pad and a retractor means made in accordance with the principles of the present invention, in position to permit the traction wheel to run up onto the anti-skid pad.

Referring now to the drawings, and in particular to FIG. 1, the numeral 10 generally designates the right rear end of a passenger automobile with which the anti-skid device of the present invention may be used. The anti-skid device of the present invention includes an elongated anti-skid pad, generally indicated by the numeral 11, an elongated retraction cable generally indicated by the numeral 12, and a mechanical retractor means attached to the rear bumper of the vehicle and generally indicated by the numeral 13. The numerals 11a and 12a generally indicate the retracted positions of the anti-skid pad 11 and the retraction cable 12, after the vehicle wheel 9 has moved over the pad 11 and the retractor means has retracted the cable 12.

As shown in FIG. 1, the retractor means 13 is releasably secured to the rear bumper of the vehicle 10 by a pair of attachment straps, which are each generally indicated by the numeral 14. As shown in FIGS. 18 and 19, the attachment straps 14 each includes an elongated rectangular body 15 which has an attachment hook 17 secured to one end thereof, by a mounting clamp member 16. The elongated body 15 of the attachment strap 14 is provided with a plurality of evenly spaced apart, longitudinally aligned holes 18.

As shown in FIGS. 16 and 17, the elongated anti-skid pad 11 includes an elongated body 21 which is made from a suitable material, as for example, a suitable plastic or a lightweight metal. The pad body 21 is provided with a plurality of studs 22, which have one end fixedly mounted in the pad body 21 and the other end extended downwardly for engagement with the ground. The anti-skid pad 11 is also provided with a U-shaped handle 23 on one side thereof, adjacent the rear end thereof. The handle 23 is fixedly secured to the pad 21 by any suitable means, as by welding. The pad 11 may be provided with a pair of handles 23, with one being disposed on one side and the other on the opposite side of the pad, if desired.

Figure 2:
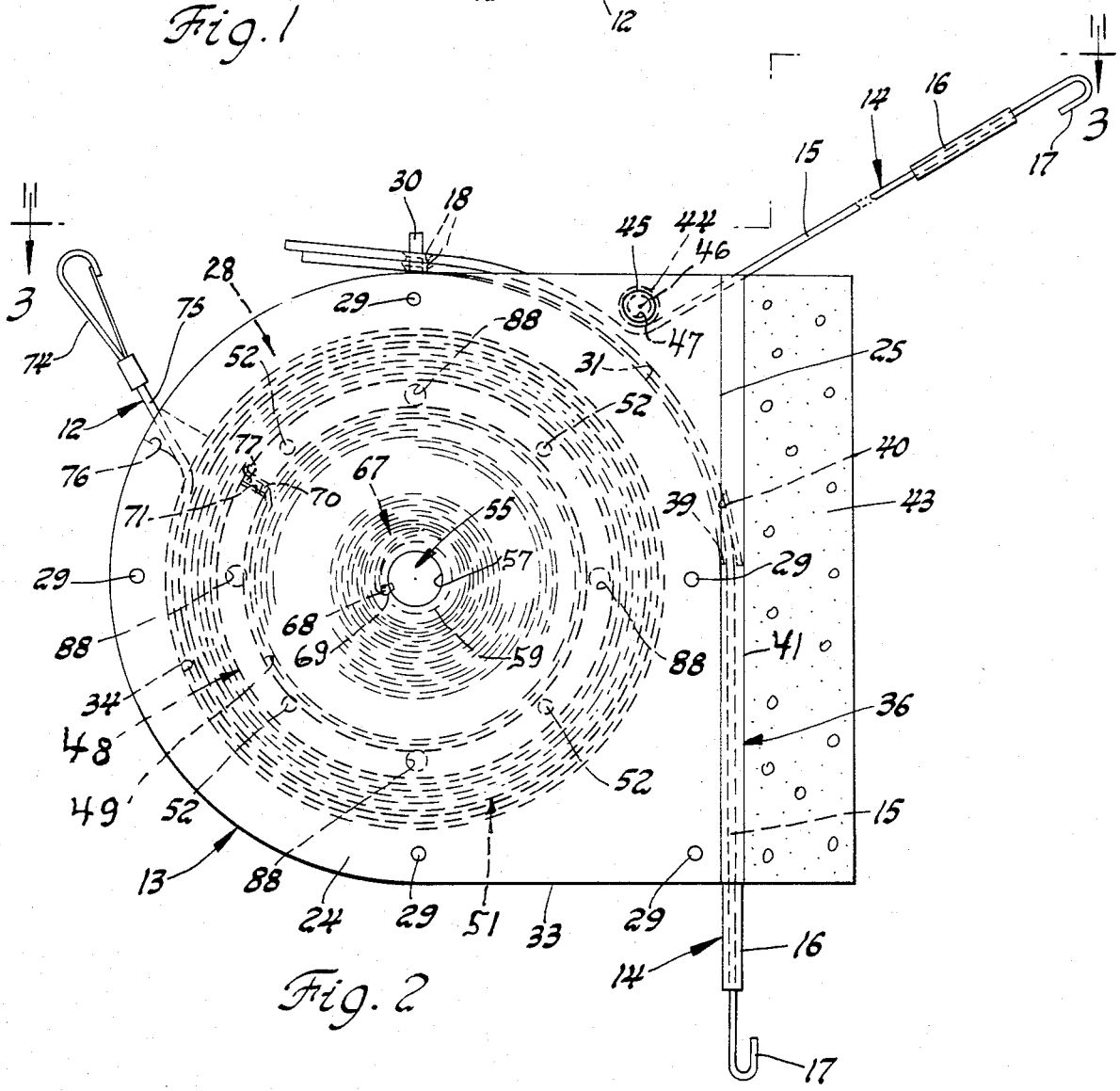
FIG. 2 is an enlarged side elevation view of the anti-skid device retractor means structure illustrated in FIG. 1.
Figure 3:
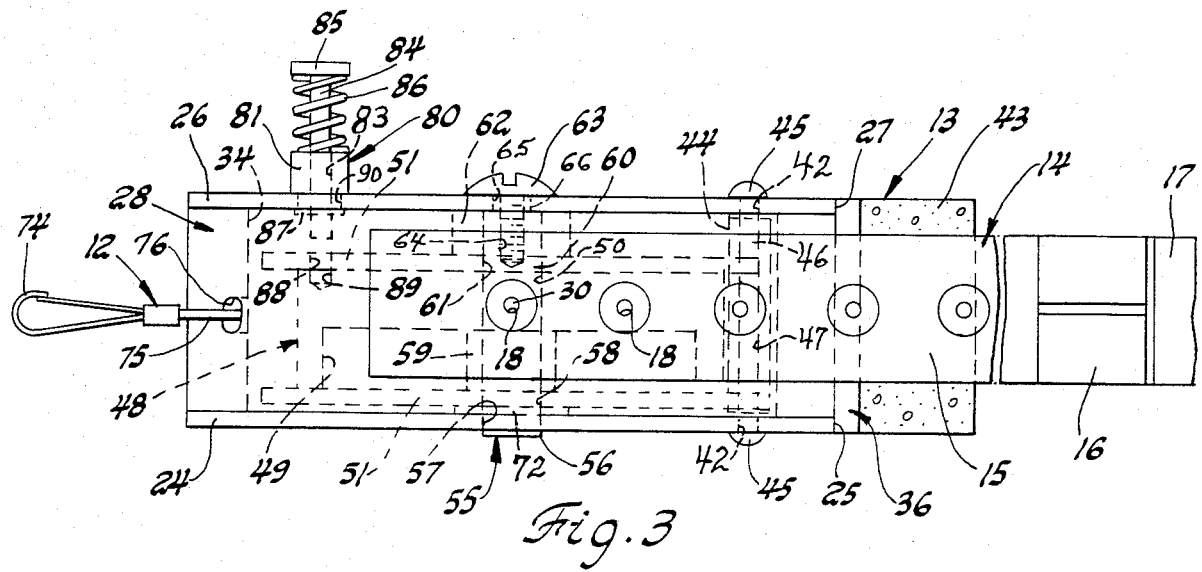
FIG. 3 is a top plan view of the retractor means structure illustrated in FIG. 2, taken along the line 3—3 thereof, and looking in the direction of the arrows.
Figure 4:
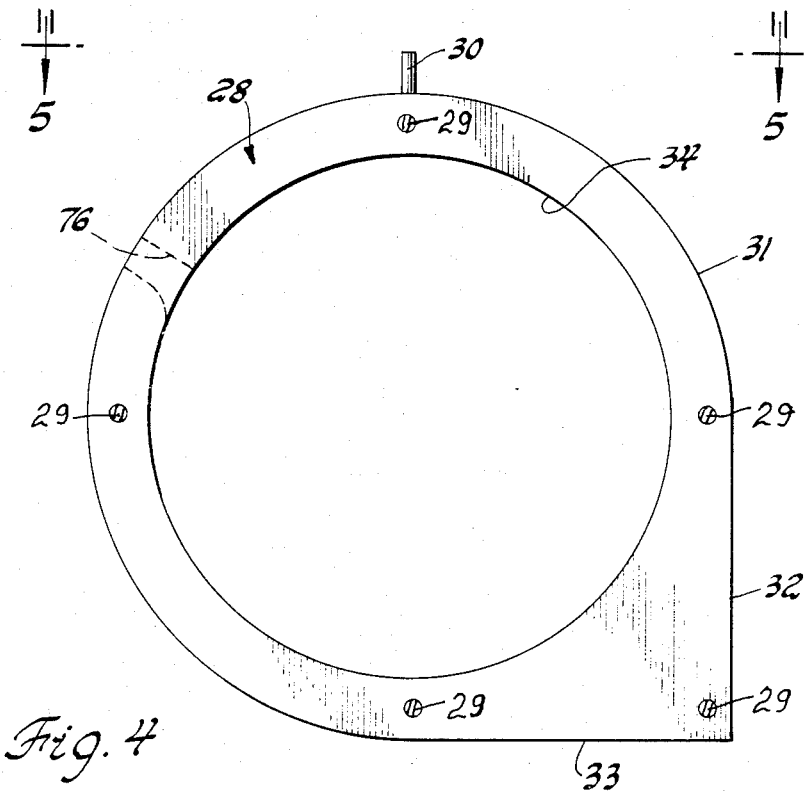
FIG. 4 is a side elevation view of the housing body employed in the retractor means of FIG. 2.

As shown in FIGS. 2 and 3, the retractor means 13 is provided with a side plate 24 which is semi-circular on the front end thereof, and which is substantially rectangular on the rear end thereof, and provided with a straight vertical rear edge 25. As shown in FIG. 3, the retractor means 13 further includes a second laterally spaced apart side wall 26 with a straight vertical rear end 27, and which is identical in shape to the shape of the first named side plate 24 as shown in FIG. 2. As shown in FIGS. 2 and 3, the retractor means 13 includes a body 28, which is also shown in detail in FIG. 4. The retractor body 28 is circular for $\frac{3}{4}$ of its periphery and it has a right angular periphery for the other $\frac{1}{4}$ thereof, as shown in FIG. 4. As best seen in FIG. 3 the retractor body 28 is disposed between the side plates 24 and 26, and it is fixedly secured in place therebetween by any suitable means, as by a plurality of rivets 29. It will be understood that suitable bolts and nuts, or other means, may be also used for securing the side plates 24 and 26 to the retractor body 28, if desired.

As shown in FIG. 4, the periphery of the retractor body 28 is circular for approximately $\frac{3}{4}$ of the way around and is indicated by the numeral 31. The other $\frac{1}{4}$ periphery of the retractor body 28 is provided with two right angular sides 32 and 33. As shown in FIG. 4, the retractor body 28 is provided with a fixedly mounted attachment strap anchor pin 30 that extends outwardly therefrom, at right angles to the periphery 31. The retractor body 28 is also provided with an internal circular chamber therein, as indicated by the numeral 34.

Figure 8:
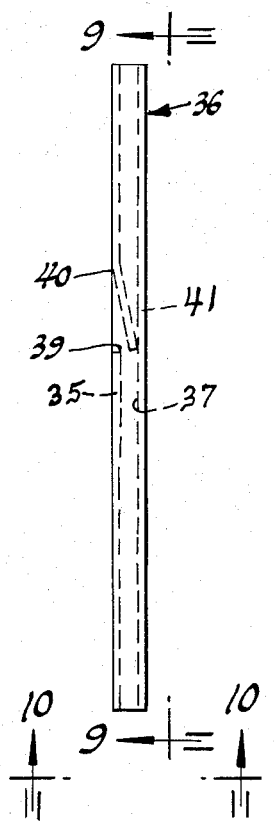
FIG. 8 is a side elevation view of an attachment strap guide chute or trough employed in the invention.
Figure 9:
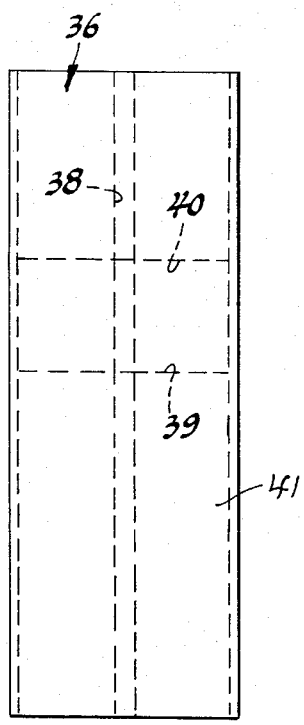
FIG. 9 is a right side elevation view of the attachment strap guide chute structure illustrated in FIG. 8, taken along the line 9—9 thereof, and looking in the direction of the arrows.
Figure 10:
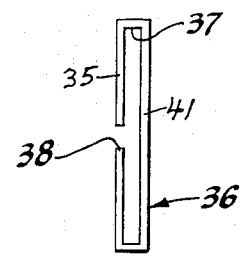
FIG. 10 is a bottom end view of the attachment strap guide chute structure illustrated in FIG. 8, taken along the line 10—10 thereof, and looking in the direction of the arrows.

As shown in FIGS. 2 and 3, the retractor means 13 includes an attachment strap guide chute or trough, generally indicated by the numeral 36, which is fixedly secured to the rear straight faces 25 and 27 of the side plates 24 and 26, respectively, by any suitable means as by means of a suitable adhesive. As shown in FIGS. 8, 9 and 10, the attachment strap guide trough 36 is rectangular in cross section and includes a rectangular inner passage 37. One of the longer side walls 35 of the trough 36 is provided with a longitudinal slot 38. Formed through the same side wall 35 of the trough 36 is a transverse slot, which is bounded by the end points 40 and 39, to permit an attachment strap 14 to be slid through the trough 36 and outwardly through the transverse slot formed between the slot end points 39 and 40. As shown in FIGS. 2 and 3, the retractor means 13 further includes a self compressable rectangular piece of material 43, such as a sponge, which is fixedly secured to the outer face of the other trough side wall 41, by any suitable means, as by a suitable adhesive.

As shown in FIG. 2, the retractor means 13 is adapted to be releasably secured to the bumper of a vehicle as for example, the rear bumper as shown in FIG. 1, by means of a pair of the attachment straps 14. As shown in FIG. 2, the free end of a first attachment strap 14 is passed through the lower end of the trough 36, and upwardly and out through the transverse slot formed between the trough end points 39 and 40 in the trough side wall 35, and then around the arcuate surface 31 of the retractor body 28 and with one of the holes 18 therein being mounted over the attachment strap anchor pin 30. The other or second attachment strap 14 has its free end extended between the plates 24 and 26, and around a roller 44 and over the outer face of the first attachment strap 14, and then it has its rear end secured to the anchor pin 30 by means of one of the holes 18 formed through its elongated body portion 15. As best seen in FIG. 3, the attachment strap roller 44 is rollably mounted on a transverse shaft 46, which has its ends extending through holes 42 in the side plates 24 and 26. The mounting shaft 46 extends through an axial hole 47 formed through the roller 44. The ends of the shaft 46 are upset, or formed as a rivet head, as indicated by the numeral 45.

Figure 11:
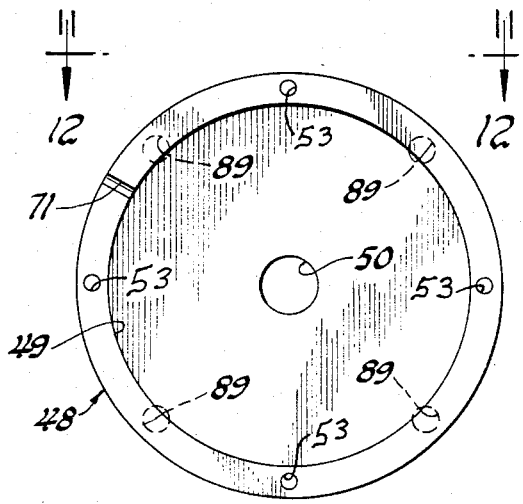
FIG. 11 is a side elevation view of a cable reel employed in the invention.

As shown in FIGS. 2, 3, 11 and 12, the retractor means 13 includes a cable and retractor spring reel comprising an annular body, generally indicated by the numeral 48, and a pair of side plates 5. The annular body 48 is provided with an annular spring chamber 49 (FIGS. 3 and 12) which extends inwardly from one side face thereof. The reel body 48 is provided with a transverse axial bore 50. As indicated in FIG. 2, the reel side plates 51 are fixedly secured to the reel body 48 by a plurality of rivets 52. The rivets 52 are adapted to extend through holes 54 which are formed through the side plates 51 (FIG. 13), and holes 53 formed through the reel body 48 (FIG. 11). It will be understood that suitable bolts and nuts, or other attachment means, may also be used for securing the reel side plates 51 to the reel body 48, if desired.

Figure 14:
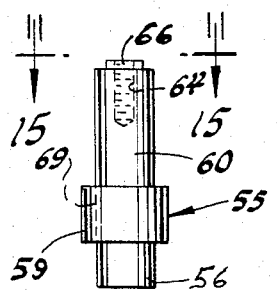
FIG. 14 is an elevation view of a stationary pivot shaft for the cable reel illustrated in FIGS. 11 and 12.
Figure 15:
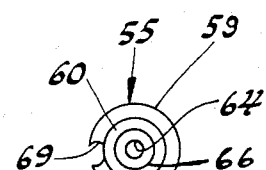
FIG. 15 is an end elevation view of the cable reel structure illustrated in FIG. 14, taken along the line 15—15 thereof, and looking in the direction of the arrows.

As shown in FIGS. 2 and 3, the retractor cable and retractor spring reel, comprising the body 48 and the side plates 51, is rotatably mounted in the fixed retractor body 28 by a stationary mounting shaft, generally indicated by the numeral 55. As shown in FIGS. 14 and 15, the reel mounting shaft 55 includes a first elongated cylindrical portion 60, which has one end integrally connected to an end of an enlarged diameter flange 59. Integrally formed on the second or other end of the enlarged diameter flange 59 is a second cylindrical shaft portion 56. As shown in FIG. 3, the shaft 55 rotatably supports the cable and retractor spring reel in the retractor means housing, between the side plates 24 and 26.

As shown in FIG. 3, the outer end of the reduced diameter shaft end 56 is mounted in a hole 57 formed through the housing side plate 24. The shaft portion 56 also extends through a washer 72 which is disposed between the adjacent reel side plate 51 and the inner face of the retractor housing side plate 24. The inner end of the shaft portion 56 is disposed through an axial hole 58, in the adjacent reel side plate 51. As shown in FIG. 3, the enlarged diameter, annular flange 59 on the shaft 55 is disposed inside the recess 49 in the reel body 48, and its one axial end is seated against the inner end wall of said recess and the other axial end is seated against the inner face of the adjacent reel plate 51. The elongated cylindrical portion 60 of the shaft 55 is mounted through an axial bore 61 which is formed through the other reel side plate 51. A large annular spacer or washer 62 is mounted around the outer end of the shaft portion 60, and has its inner axial face seated against the outer face of the adjacent reel plate 51 and the other axial face disposed against the inner face of the adjacent retractor means housing plate 26.

As shown in FIG. 14, the shaft 55 has a reduced diameter end 66 on the free end of the shaft portion 60. As shown in FIG. 3, said reduced shaft end 66 is seated in an axial hole 65 which is formed through the retractor means housing plate 26. The shaft 55 is provided with an axial threaded bore 64 which extends inwardly through the reduced diameter portion 66 and into the shaft portion 60. A suitable retainer screw 63 is threadably mounted in the threaded bore 64 for retaining the shaft 55 in a stationary position in the retractor means housing between the housing side plates 24 and 26.

Figure 12:
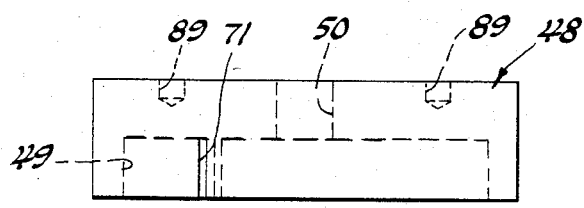
FIG. 12 is a top plan view of the cable reel structure illustrated in FIG. 11, taken along the line 12—12 thereof, and looking in the direction of the arrows.
Figure 13:
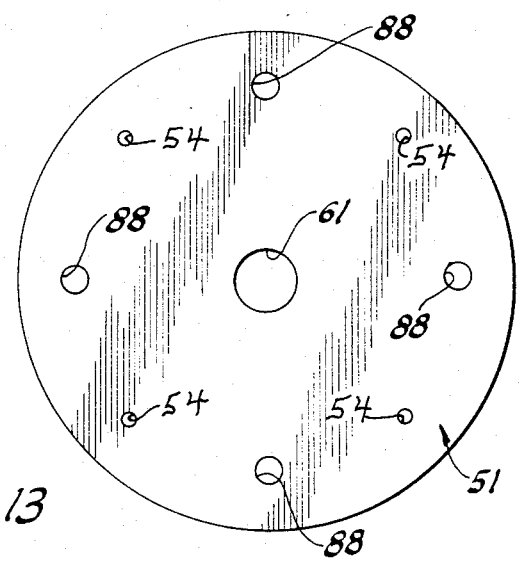
FIG. 13 is a side elevation view of a retractor means side plate employed in the invention.

As shown in FIG. 2, a coiled retractor spring, generally indicated by the numeral 67, is operatively mounted within the recess 49 in the annular cable reel body 48. The inner end 68 of the retractor spring 67 is fixedly secured in an axial slot 69 (FIGS. 2 and 14), formed in the enlarged portion 59 of the fixed shaft 55. As shown in FIG. 2, the outer end 70 of the retractor spring 67 is fixedly mounted in the inner end of a radial slot or hole 71 that is formed in the outer periphery of the reel body 48, as shown in FIGS. 2, 11 and 12.

As shown in FIGS. 1, 2 and 3, the retractor cable means 12 is provided on its free end with a snap-on clip or hook 74 for releasable attachment of the cable means 12 to the anti-skid pad handle 23. The cable line per se is indicated by the numeral 75. As shown in FIG. 2, the cable line 75 is mounted through a radial hole or slot 76, which is formed through the retractor means housing periphery 28, and which communicates at its inner end with the chamber 34 that is formed within the retractor means housing between the outer periphery of the chamber 34 and the outer periphery of the cable reel. The cable line 75 is wound around the reel body 48 between the side plates 51, and the free end 77 thereof is fixedly mounted in the outer end of the radial slot 71.

Figure 6:
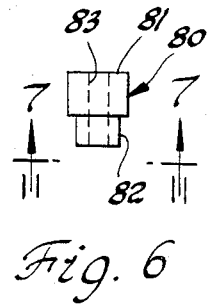
FIG. 6 is a side elevation view of a release pin housing employed in the invention.
Figure 7:
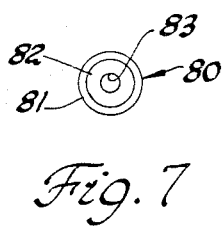
FIG. 7 is a bottom plan of the release pin housing structure illustrated in FIG. 6, taken along the line 7—7 thereof, and looking in the direction of the arrows.
Figure 5:
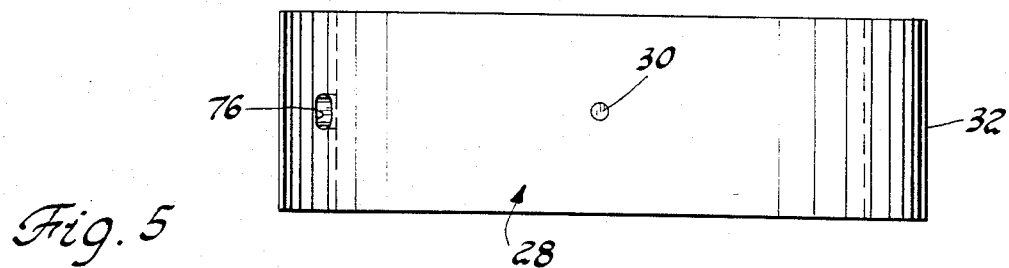
FIG. 5 is a top plan view of the housing body structure illustrated in FIG. 4, taken along the line 5—5 thereof, and looking in the direction of the arrows.

The release pin housing, generally indicated by the numeral 80, is shown in FIGS. 3, 6 and 7. The release pin housing 80 includes a outer cylindrical end 81, and an integral reduced diameter cylindrical inner end 82. An axial bore 83 is formed through the pin housing 80. As shown in FIG. 3, the inner reduced diameter end 82 of the pin housing 80 is fixedly mounted by any suitable means, as by a press fit in a hole 90, which is formed through the retractor means housing side plate 26. An elongated cylindrical release pin 84 is slidably mounted through the axial bore 83, and its inner end extends into the chamber 34 within the retractor means housing. The release pin 84 is provided with an integral annular head 85. A coiled release spring 86 is mounted around the release pin 82, and the outer end thereof is seated against the inner side of the pin head 85, and the inner end thereof is seated on the outer end of the pin housing outer end portion 81. Operatively mounted on the inner end of the release pin 84 is a releasable retainer ring 87 which is connected to the pin 84 so as to limit the outward axial movement of the pin 84 by the spring 86. The release spring 86 moves the release pin 84 to the inactive position shown in FIG. 3, with the retainer ring 87 abutting the inner face of the retractor means housing side plate 26.

Although only one retractor means 13 and one anti-skid pad 11 has been illustrated, it will be understood that, in use, two or more of the anti-skid devices of the present invention may be employed on a vehicle. For example, two of the anti-skid devices could be employed on the two rear wheels, or on the two front wheels, or on any other two selected wheels which are in a stuck position. Also, it will be understood that an individual anti-skid device could be simultaneously employed with each wheel of a vehicle.

The use of the anti-skid device of the present invention will be understood from the following description of the operation of a single anti-skid device of the type illustrated in FIG. 1. Assuming the vehicle 10 is in a position on a slippery pavement, or other road surface wherein the right rear drive wheel 9 cannot obtain driving friction, the user of the apparatus of the present invention would first mount the retractor means 13 on the rear bumper of the vehicle by employing the two attachment straps 14 and securing them in a position with the two hooks engaging the upper and lower edges of the bumper to hold the sponge 43 tightly against the rear bumper. The cable 75 is pulled outwardly from the retractor means housing for its full length, about eight feet, and such an action provides a winding up or tensioning of the coil spring 67. When the cable 75 has been pulled out to its full length, the release pin 84 is pressed inwardly by the operator to move the inner end of the pin 84 into engagement with a pair of aligned holes 88 and 89, as shown in FIG. 3, which are formed through one of the reel side plates 51, and in the reel body 48, respectively. As viewed in FIG. 2, it will be seen that when the cable 75 is pulled outwardly of the retractor means housing, such action will rotate the cable and spring reel in a clockwise direction. Such rotation will wind up the spring 67 to provide a retractive action, as described hereinafter. When the cable 75 is pulled out to its full length, the release pin 84 is pushed inwardly into the holes 88 and 89 in the cable reel, and the tension on the cable 75 is released and the spring 67 has a tendency to rotate counter-clockwise and it provides a frictional grip on the inner end of the release pin 84. That is, the holes 88 and 89 engage the inner end of the pin 84 and hold it in the inward spring loaded position. The operator can then release the inward pushing force on the pin 84 and the cable 75 remains extended.

The snap-on clip or hook 74 on the cable 75 is then connected to the handle 23 on the anti-skid pad 11. The anti-skid pad 11 is then positioned as shown in FIG. 1 with the rear end thereof wedged under the front end of the traction or drive wheel 9. The operator then drives the car forward slowly, so that the drive wheel 9 will move onto the pad 11, and when the wheel 9 is on the pad 11 the driver accelerates the vehicle quickly to go forward and ride over the pad 11. The operator can then keep the vehicle moving forwardly until it is free of the slippery pavement. In the meantime, after the wheel 9 has moved forwardly over the pad 11, and to a distance about equal to the length of the extended cable line 75 (about eight feet), the continued forward movement of the vehicle will produce a jerk on the cable line 75, due to the action of the commencing of the dragging of the pad 11, and such a jerk will provide a slight clockwise rotation of the cable and retraction spring reel, as viewed in FIG. 2, to release the friction grip on the inner end of the release pin 84, whereby the spring load created by the release spring 86 will move the release pin 84 outwardly to permit the retractor return spring 67 to rotate the reel in a counter-clockwise direction, as viewed in FIG. 2. The last mentioned rotating action will then pull the cable 75 into the retractor housing, and wind it up on the reel body 48 to the position shown in FIG. 2. The operator can stop on pavement where the vehicle will not get stuck and unclip the pad 11 and store it in the vehicle. The retractor means 13 can also be disconnected at that time and stored in the vehicle, or it could be left on the vehicle.

INDUSTRIAL APPLICABILITY

The anti-skid device of the present invention is adapted for use with any type of motor vehicle, such as an automobile, truck, bus or the like. The anti-skid device may be used singly, or simultaneously in multiple units. It may be used to provide traction for a vehicle wheel on slippery road surfaces, muddy road surfaces, and the like.

I claim:

1. An anti-skid device for use with a vehicle ground engaging wheel, characterized in that it includes:
    (a) an elongated traction pad having an end for wedging under the front end of a ground engaging wheel of a vehicle, and to allow production of traction on said pad upon rotation of said wheel onto the pad during a forward movement of the vehicle;
    (b) a retractor means operatively mounted on the vehicle;
    (c) said retractor means having a housing and including a cable coiled therein and adapted to have an outer end manually withdrawn therefrom and detachably connected to said pad; and,
    (d) said retractor means including means for retracting said cable into the retractor means housing after said vehicle wheel has been moved onto the pad and over the same during a forward movement of the vehicle, the cable retracting means being operative to retract the cable into the retractor means housing and hold the pad in a position adjacent the retractor means.

2. An anti-skid device as defined in claim 1, characterized in that:
    (a) said means for retracting said cable into the retractor means comprises a spring return means for retracting the cable into the retractor means housing.

3. An anti-skid device as defined in claim 2, characterized in that:
    (a) said spring return means includes a reel rotatably mounted in the retractor means housing, and having a coiled return spring operatively mounted therein, with one end fixed to a stationary axial shaft on which the reel is rotatably mounted in said retractor means housing, and the other end connected to the reel;
    (b) said cable being coiled around the outer periphery of the reel, and having an inner and fixedly connected to the reel, whereby when the outer end of the cable is pulled to withdraw the cable from said housing, said reel will be rotated in a direction to wind up said return spring and put a return tension thereon; and,
    (c) a spring loaded release pin adapted to be releasably and frictionally engaged with said reel to hold it in a position with the outer end of the cable connected to said pad and with the return spring in said reel under said return tension, so that after the vehicle wheel has passed over said pad and moved forwardly the length of the cable withdrawn from the retractor means, the continued forward movement of the vehicle will exert a jerk on said cable, whereby said spring loaded release pin will be released from the frictional engagement with said reel to permit the return spring in the reel to turn the reel to retract the cable and rewind the cable around the reel in the retractor means housing.

4. An anti-skid device as defined in claim 3, characterized in that:
    (a) said spring loaded release pin is adapted to releasably engage a hole in the side of the reel and be held therein by the tendency of the reel to turn in a direction to unwind the return spring.

5. An anti-skid device as defined in claim 3, characterized in that:
    (a) said pad is provided with at least one handle on one end thereof; and,
    (b) the outer end of said cable is provided with a releasable snap-on clip means for detachably connecting the cable to said handle.

6. An anti-skid device as defined in claim 3, characterized in that:
    (a) said pad is provided with a plurality of ground-engaging traction studs.

7. An anti-skid device as defined in claim 3, characterized in that:
    (a) the retractor means is adapted to be detachably mounted on the bumper of a vehicle by at least two adjustably mounted attachment straps.

8. An anti-skid device as defined in claim 7 characterized in that:
    (a) said retractor means is provided with a cushion means on the side adjacent the bumper on a vehicle to allow positioning of the retractor means on bumpers having various types of exterior configurations.

9. An anti-skid device for use with a vehicle ground engaging wheel, characterized in that it includes:
    (a) an elongated traction pad having an end for wedging under the ground engaging wheel of a vehicle, and to allow production of traction upon rotation of said wheel onto the pad;
    (b) a retractor means adapted to be operatively mounted on the vehicle:
    (c) said retractor means having a housing and including a cable coiled therein and adapted to have an outer end manually withdrawn therefrom and detachably connected to said pad;
    (d) said retractor means including means for retracting said cable into the retractor means housing after said vehicle wheel has been moved onto the pad and over the same, the cable retracting means being operative to retract the cable into the retractor means housing and hold the pad in a position adjacent the retractor means;
    (e) said means for retracting said cable into the retractor means comprises a spring return means for retracting the cable into the retractor means housing;

(f) said spring return means includes a reel rotatably mounted in the retractor means housing, and having a coiled return spring operatively mounted therein, with one end fixed to a stationary axial shaft on which the reel is rotatably mounted in said retractor means housing, and the other end connected to the reel;

(g) said cable being coiled around the outer periphery of the reel, and having an inner end fixedly connected to the reel, whereby when the outer end of the cable is pulled to withdraw the cable from said housing, said reel will be rotated in a direction to wind up said return spring and put a return tension thereon;

(h) a spring loaded release pin adapted to be releasably and frictionally engaged with said reel to hold it in a position with the outer end of the cable connected to said pad and with the return spring in said reel under said return tension, so that after the vehicle wheel has passed over said pad and moved forwardly the length of the cable withdrawn from the retractor means, the continued forward movement of the vehicle will exert a jerk on said cable, whereby said spring loaded release pin will be released from the frictional engagement with said reel to permit the return spring in the reel to turn the reel to retract the cable and rewind the cable around the reel in the retractor means housing;

(i) the retractor means is adapted to be detachably mounted on the bumper of a vehicle by at least two adjustably mounted attachment straps; and, (j) (a) each of said attachment straps is provided with hook means on one end thereof for attachment to the horizontal edge of a bumper, and the other end of each strap is provided with a plurality of holes for releasable engagement of one of said holes over an anchor pin fixedly mounted on the retractor means housing.

* * * * *

UNITED STATES PATENT OFFICE
CERTIFICATE OF CORRECTION

Patent No. 4,534,508                Dated August 13, 1985

Inventor(s) Lucas Willner, Jr.

It is certified that error appears in the above-identified patent and that said Letters Patent are hereby corrected as shown below:

Column 1, line 46 - "tractor" should be --retractor--.

Column 4, line 36 - delete "5" and insert --51--.

Column 5, line 65 - delete "82" and insert --84--.

Column 7, line 65 - delete "and" (2nd occurrence) and insert --end--.

Signed and Sealed this

Twenty-ninth Day of October 1985

[SEAL]

Attest:

DONALD J. QUIGG

Attesting Officer

Commissioner of Patents and
Trademarks—Designate